United States Patent [19]

Taniguchi et al.

[11] Patent Number: 5,501,645
[45] Date of Patent: Mar. 26, 1996

[54] CONTROL SYSTEM FOR VEHICULAR AUTOMATIC TRANSMISSIONS WITH A QUICK-SHIFT HYDRAULIC SYSTEM FOR MANUAL SHIFTING

[75] Inventors: Takao Taniguchi, Okazaki; Kazumasa Tsukamoto, Toyota; Masahiro Hayabuchi, Anjo; Masahiko Ando, Okazaki, all of Japan

[73] Assignee: Aisin Aw Co., Ltd., Japan

[21] Appl. No.: 228,186

[22] Filed: Apr. 15, 1994

Related U.S. Application Data

[63] Continuation of Ser. No. 964,625, Oct. 23, 1992, abandoned.

[30] Foreign Application Priority Data

Oct. 24, 1991 [JP] Japan .................... 3-277549

[51] Int. Cl.$^6$ .................... F16H 61/24; B60K 41/06
[52] U.S. Cl. .................... 477/130; 477/131; 477/138; 477/118; 475/123
[58] Field of Search .................... 477/118, 119, 477/130, 131, 138; 475/123, 127, 128

[56] References Cited

U.S. PATENT DOCUMENTS

| | | | |
|---|---|---|---|
| 4,817,472 | 4/1989 | Kubo et al. | 74/867 X |
| 4,947,330 | 8/1990 | Hiramatsu | 477/131 X |
| 4,991,464 | 2/1991 | Ishikawa et al. | 477/119 X |
| 5,033,331 | 7/1991 | Takada et al. | 74/868 X |
| 5,115,696 | 5/1992 | Takada et al. | 74/869 |

FOREIGN PATENT DOCUMENTS

| | | | |
|---|---|---|---|
| 61-157855 | 7/1986 | Japan . | |
| 402066373 | 3/1990 | Japan | 477/130 |

*Primary Examiner*—Q. Ta Khoi
*Attorney, Agent, or Firm*—Lorusso & Loud

[57] ABSTRACT

A vehicular automatic transmission and control system therefor includes an automatic transmission including a planetary gear unit and a plurality of friction elements for connecting the components of the planetary gear unit selectively to rotary members or stationary members; a hydraulic control unit for selectively switching and controlling oil pressures to be fed to the friction elements; and an electronic control unit for outputting a signal indicating the running state of a vehicle to control the feed of the oil pressures to the friction elements. The hydraulic control unit includes first and second hydraulic servos for establishing a first gear stage by connecting either the rotary members to each other or the rotary members and the stationary members; a third hydraulic servo for establishing a second gear stage; shift switch system for switching and controlling the feed of oil pressure to either the first or third hydraulic servo in accordance with the vehicle running state; and switch system for controlling the feed of the oil pressure to one of the first and second hydraulic servos in accordance with the signal of the electronic control unit indicating the vehicle running state.

10 Claims, 16 Drawing Sheets

| | C0 | C1 | C2 | B0 | B1 | B2 | B3 | B4 | B5 | F0 | F1 | F2 | F3 |
|---|---|---|---|---|---|---|---|---|---|---|---|---|---|
| P | | | | ○ | | | | | | | | | |
| REV | | | ○ | ○ | | | | | ○ | | | | |
| N | | | | ○ | | | | | | | | | |
| 1ST | ○ | ○ | | | | | | | ⊚ | ○ | | | ○ |
| 2ND | ○ | ○ | | | | | ⊚ | ○ | | ○ | | ○ | |
| 3RD | ○ | ○ | | | ⊚ | ○ | | △ | | ○ | ○ | | |
| 4TH | ○ | ○ | ○ | | | △ | | △ | | ○ | | | |
| 5TH | | ○ | ○ | ○ | | △ | | △ | | | | | |

FIG. 6

△ : ENGAGED BUT NO TORQUE TRANSMISSION ( ) : DURING BRAKING BY ENGINE

| | SOLENOID | | | | | | | CLUTCH | | | | BRAKE | | | | | | O.W.C. | | | |
|---|---|---|---|---|---|---|---|---|---|---|---|---|---|---|---|---|---|---|---|---|---|
| | S1 | S2 | S3 | S4 | SLU | SLN | C0 | C1 | C2 | B0 | B1 | B2 | B3 | B4 | B5 | F0 | F1 | F2 | F3 |
| 1→2 SHIFT | ○ | ○ | × | × | ◎ | ☆ | ○ | ○ | × | × | × | × | ☆ | ☆ | ○→× | ○ | × | ×→☆ | ○→× |
| 2→3 SHIFT | × | ○ | × | × | ◎ | ☆ | ○ | ○ | × | × | × | ☆ | ○→× | ○ | × | ○ | ×→☆ | ○→× | × |
| 3→4 SHIFT | × | × | ○ | × | ◎ | ☆ | ○ | ○ | ☆ | × | ○→× | ○ | × | ○ | × | ○ | ○→× | × | × |
| 4→5 SHIFT | × | × | × | × | ◎ | ☆ | ○→× | ○ | ○ | ☆ | × | ○ | × | ○ | × | ○→× | × | × | × |
| ○ | ON | | | | | | ENGAGE | | | | | | | | | LOCK | | | |
| × | OFF | | | | | | RELEASE | | | | | | | | | FREE | | | |
| ☆ | SWEEP CONTROL OF SLN | | | | | | ENGAGE BY DIRECT CONTROL USING PRESSURE REGULATE VALVE | | | | | | | | | LOCK IN SWEEP CONTROL | | | |
| ◎ | ON: L-up ON OFF: L-up OFF | | | | | | — | | | | | | | | | — | | | |

QUICK SHIFT (OPERATE AFTER SHIFT END)

REMARKS

FIG. 7

CONTROL SYSTEM FOR VEHICULAR AUTOMATIC TRANSMISSIONS WITH A QUICK-SHIFT HYDRAULIC SYSTEM FOR MANUAL SHIFTING

This application is a continuation of application Ser. No. 07/964,625, filed 23 Oct. 1992, now abandoned.

BACKGROUND OF THE INVENTION

1. Field of the Invention

The present invention relates to a control system for a vehicular automatic transmission.

2. Description of the Prior Art

The prior art control of an automatic transmission for a vehicle is responsive to the operations of a driver and the running state of the vehicle and provides D-range, manual and kick-down.

However, the timing for a shift does not always conform to the will of the driver but is subject to a delay in response or shocks due to an indiscriminate control so that proper control is not achieved in all situations. When "manual" shifting is performed by a shift lever, for example, a shift change cannot be quickly effected according to the manipulation of the shift lever so that the shift feel is frequently poor and shocks occur.

SUMMARY OF THE INVENTION

Therefore, the present invention has an object to provide a control system for a vehicular automatic transmission, which can conform to the will of a driver and can change the shifts in quick response to the upshift and downshift in the power-ON or power-OFF state.

According to the present invention, there is provided a control system for an automatic transmission 11 which includes a plurality of planetary gear units 22 and 23 and a plurality of friction elements for connecting the components of said planetary gear unit selectively to rotary members or stationary members. A hydraulic control unit 200 selectively switches and controls oil pressures fed to the friction element operators and an electronic control unit 300 outputs a signal indicating the running state of the vehicle for control of the oil pressures to the friction element operators. The hydraulic control unit includes first and third hydraulic servos 220 and 210 for achieving a first gear stage by connecting either the rotary members to each other or the rotary members and said stationary members; a second hydraulic servo 230 for achieving a second gear stage; shift switch means 240 for switching and controlling the line oil pressure from oil pressure generating means 400 to either the second or third hydraulic servo in accordance with the running state of the vehicle; and switch means 250 for directing the feed of oil pressure to only a selected one of the first and third hydraulic servos in accordance with the signal from the electronic control unit indicating the running state of the vehicle. Oil pressure regulating means regulates the line pressure received from oil pressure generating means 400 and supplies a control pressure to first switch means 250.

The present invention provides proper control in all states by four patterns of upshift and downshifts in power-ON and power-OFF states. In a power-ON 2–3 upshift, for example, after a shift signal has been generated and before the shift, the oil pressure of a 2nd speed engine brake B-3 is quickly discharged, and a third hydraulic servo (B-2) is then fed with the oil pressure to complete the 2–3 shift. After the end of the shift, the oil pressure is fed to a first hydraulic servo (to engage B-1) because the braking by the engine is better effected for the manual shift at all the gear stages. In a power-OFF 2–3 upshift, on the other hand, the oil pressure to a hydraulic servo at a lower (2nd speed) gear stage is discharged (to release B-3), and the oil pressure is then quickly fed to the first hydraulic servo (to engage B-1) thereby establishing the higher speed (3rd speed) gear stage. After establishing this higher speed (3rd speed) gear stage, the feed of the oil pressure to the third hydraulic servo B-2 is ended (to engage B-2). In the power-ON 3–2 downshift (or kick-down) and the power-OFF 3–2 downshift (or manual downshift), on the other hand, the oil pressure of the second hydraulic servo for achieving a higher gear stage is discharged (to release B-1), and the oil pressure to the first hydraulic servo (B-2) is then released in accordance with the running state of the vehicle. After the lower gear stage has been achieved, moreover, the oil pressure is fed to the third hydraulic servo (to engage B-3) (for switching the shift valves). Thus, proper control can be accomplished in all states with flexibility to respond to the will of the driver by dividing the shifting situations into the four patterns to effect all the shifts in quick response.

BRIEF DESCRIPTION OF THE DRAWINGS

Other objects and advantages of the present invention will become apparent from the following description to be made with reference to the accompanying drawings, in which:

FIG. 6 is a table illustrating operations of an automatic transmission equipped with the control system of the present invention;

FIG. 7 is a table illustrating operations in quick shift control;

DESCRIPTION OF THE PREFERRED EMBODIMENT

Preferred embodiments of the present invention will now be described in detail with reference to the accompanying drawings.

Figure 5:
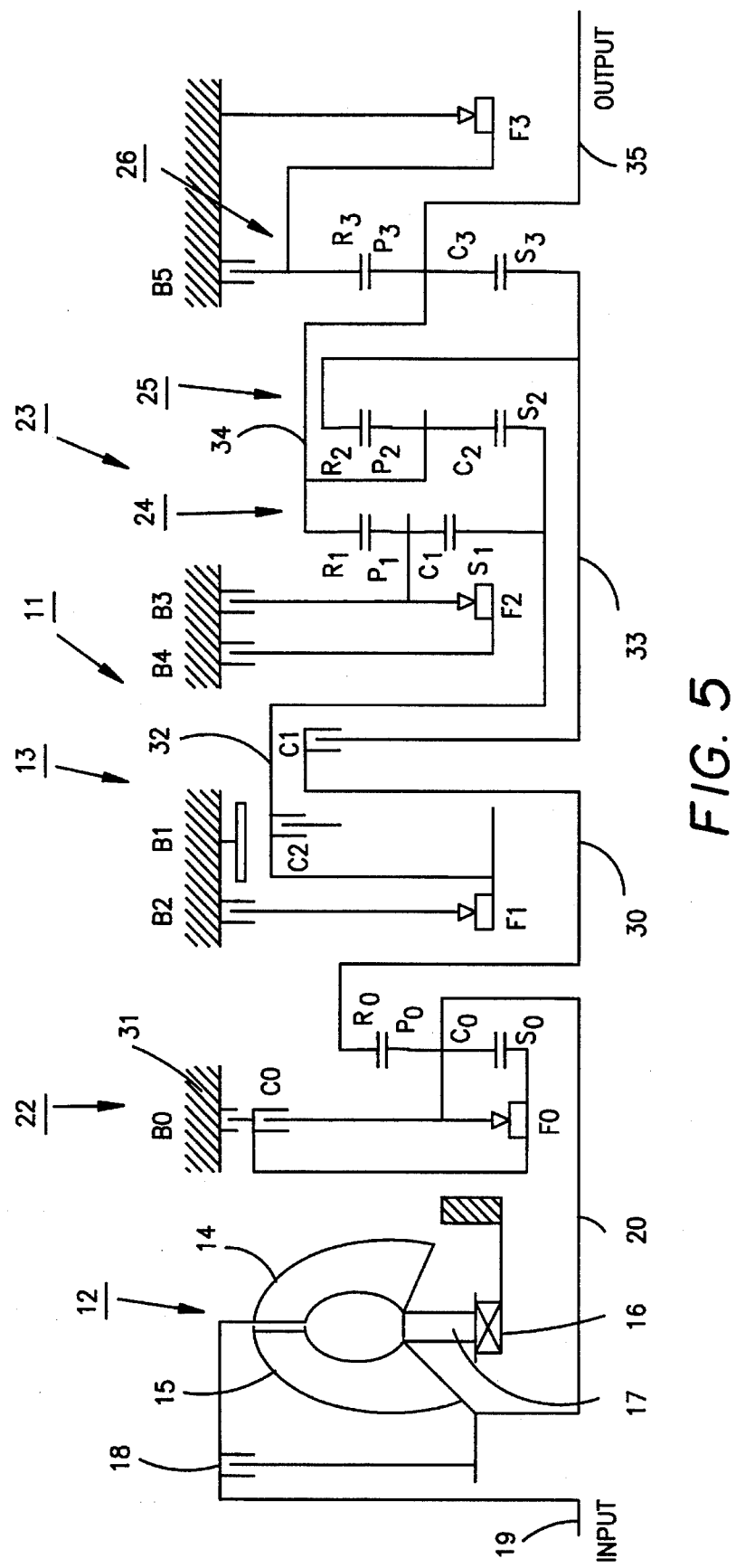
FIG. 5 is a schematic diagram showing an automatic transmission according to the present invention.

In FIG. 5 reference numeral 11 designates an automatic transmission; numeral 12 designates a torque converter for transmitting the rotation produced by an engine to the automatic transmission 11, and numeral 13 designates a transmission for changing the speed of the rotation transmitted from the torque converter 12 and outputting it. The torque converter 12 includes a pump impeller 14 for receiving the rotation of the engine; a turbine runner 15 for transmitting the rotation to the transmission 13; a one-way clutch 16; and a stator 17 mounted on the one-way clutch 16. When the pump impeller 14 is rotated by the rotation of the engine transmitted thereto, a vortex flow of working fluid is established in the torque converter 12 to rotate the aforementioned turbine runner 15.

The torque converter 12 is equipped with a lockup clutch 18 for improving the power transmission efficiency so that it transmits the rotation of an input member 19, either indirectly through the working fluid in the torque converter 12 or directly through engagement of the lockup clutch 18, to an input shaft 20 of the transmission 13.

The transmission 13 is composed of an overdrive planetary gear unit 22 and a main speed change unit 23. The main speed change unit 23 is equipped with a front planetary gear unit 24, a center planetary gear unit 25 and a rear planetary gear unit 26.

The overdrive planetary gear unit 22 is composed of a sun gear $S_0$, a ring gear $R_0$ arranged concentrically with the sun gear $S_0$, a planetary pinion $P_0$ meshing with the sun gear $S_0$ and the ring gear $R_0$, and a carrier $C_0$ rotatably supporting the planetary pinion $P_0$. The front planetary gear unit 24 is composed of a sun gear $S_1$, a ring gear $R_1$ arranged concentrically with the sun gear $S_1$, a planetary pinion $P_2$ meshing with the sun gear $S_1$ and the ring gear $R_1$, and a carrier $C_1$ rotatably supporting the planetary pinion $P_1$. The center planetary gear unit 25 is composed of a sun gear $S_2$, a ring gear $R_2$ arranged concentrically with the sun gear $S_2$, a planetary pinion $P_1$ meshing with the sun gear $S_2$ and the ring gear $R_2$, and a carrier $C_2$ rotatably supporting the planetary pinion $P_2$. The rear planetary gear unit 26 is composed of a sun gear $S_3$, a ring gear $R_3$ arranged concentrically with the sun gear $S_3$, a planetary pinion $P_3$ meshing with the sun gear $S_3$ and the ring gear $R_3$, and a carrier $C_3$ supporting the planetary pinion $P_3$.

The overdrive planetary gear unit 22 has its carrier $C_0$ connected to the input shaft 20 of the transmission 13 and its ring gear $R_0$ connected to an input shaft of a main speed change unit 23. A third clutch CO and a fourth one-way clutch FO are arranged in parallel with each other between the sun gear $S_0$ and the carrier $C_0$, and a sixth brake BO is arranged between the sun gear $S_0$ and automatic transmission casing 31.

A second clutch C2 is arranged between the input shaft 30 of the main speed change unit 23 and a first connecting member 32, and a first brake B1 is arranged between the first connecting member 32 and the automatic transmission casing 31. A second brake B2 and a first one-way clutch F1 are arranged in series with each other and in parallel with the first brake B1. The input shaft 30 is connected through a first clutch C1 to an intermediate transmission shaft 33.

In the front planetary gear unit 24, the sun gear $S_1$ is connected to the first connecting member 32, and a third brake B3 is arranged between the carrier $C_1$ and the automatic transmission casing 31. A second one-way clutch F2 and a fourth brake B4 are arranged in series with each other and in parallel with the third brake B3. The ring gear $R_1$ is connected through a second connecting member 34 to the carrier $C_2$ of the center planetary gear unit 25.

This center planetary gear unit 25 has its sun gear $S_2$ formed integrally with the sun gear $S_1$ of the front planetary gear unit 24, its carrier $C_2$ connected to the ring gear $R_1$ of the front planetary gear unit 24, and its ring gear $R_2$ connected to the intermediate transmission shaft 33.

The rear planetary gear unit 26 has its sun gear $S_3$ connected to the intermediate transmission shaft 33 and its carrier $C_3$ connected to the second connecting member 34 and an output shaft 35. Between the ring gear $R_3$ and the automatic transmission casing 31 are a fifth brake B5 and a third one-way clutch F3 in parallel.

As shown in FIG. 6, in first (1ST) speed in the D-range, the first clutch C1 and the third clutch CO are engaged. In this case, the (clockwise) rotation of the engine transmitted to the input shaft 20 is transmitted to the carrier $C_0$ of the overdrive planetary gear unit 22. At this time, the third clutch CO is engaged whereas the fourth one-way clutch FO is locked. As a result, the rotation of the input shaft 20 is directly transmitted as is to the input shaft 30 of the main speed change unit 23.

Since the main gear change unit 23 has its first clutch C1 engaged, the rotation of the input shaft 30 is transmitted to the sun gear $S_3$ of the rear planetary gear unit 26 to rotate the carrier $C_3$ and the ring gear $R_3$ in reverse through the sun gear $S_3$. However, the rotation of the ring gear $R_3$ is blocked because the third one-way clutch F3 is locked. As a result, the speed-reduced rotation is transmitted to the carrier $C_3$ which is integrated with the output shaft 35.

Next, in second (2ND) speed, the fourth brake B4 is engaged in addition to the first clutch C1 and the third clutch CO. In this case, as the fourth brake B4 is engaged, the second one-way clutch F2 is locked to lock the carrier C1 of the front planetary gear unit 24, which idly rotates forward in the 1st speed. Then, the rotation is transmitted through the intermediate transmission shaft 33 to the ring gear $R_2$ of the center planetary gear unit 25 so that the accelerated rotation is transmitted from the carrier $C_2$ to the output shaft 35.

In third (3RD) speed, the first clutch C1, the third clutch CO and the second brake B2 are engaged. In this case, as the second brake B2 is engaged, the first one-way clutch F1 is locked to lock the sun gear S2 of the center planetary gear unit 25, which has been idly rotating in reverse in 2nd speed. As a result, the accelerated rotation is transmitted from the carrier $C_2$ to the output shaft 35.

In fourth (4TH) speed, the first clutch C1, the second clutch C2 and the third clutch CO are engaged. In this case, as the second clutch C2 is engaged, the rotation of the input shaft 30 is directly transmitted as is to the output shaft 35 of the main speed change unit 23.

In a fifth (5TH) speed, the first clutch C1, the second clutch C2 and the sixth brake BO are engaged. Since the third clutch CO previously engaged is released while the sixth brake BO is engaged, the sun gear $S_0$ of the overdrive planetary gear unit 22 is locked. As a result, the accelerated rotation is transmitted to the input shaft 30 of the main speed change unit 23. Since this main speed change unit 23 is in the same directly connected state as in 4th speed, the accelerated rotation obtained at the main speed change unit 23 is transmitted as is to the output shaft 35.

In reverse (REV), on the other hand, the second clutch C2, the fifth brake B5 and the sixth brake BO are engaged. In this case, the rotation transmitted from the input shaft 20 is accelerated in the overdrive planetary gear unit 22 and transmitted to the input shaft 30 and then transmitted through the second clutch C2 to the sun gears $S_2$ and $S_3$. Since, at this time, the fifth brake B5 is engaged, the ring gear $R_3$ is locked so that the reverse rotation is output from the carrier $C_3$.

Next, the control system for the automatic transmission 11 according to the present invention will be described.

In the control system for the automatic transmission 11 of the present invention, the driver is able to select an automatic shift mode or a manual shift mode by operating a shift lever.

In the automatic shift mode, gear stages are automatically selected according to both the individual range pressures established selectively by manual valves and the running conditions, including throttle opening, vehicle speed and engine R.P.M., so that oil pressure is selectively applied to individual hydraulic servos to engage or release friction elements.

In the manual shift mode, on the other hand, the shift lever is equipped with a switch for detecting a gear stage selected by the driver. An electric signal is sent from that switch to the control system to feed the oil pressure to a predetermined hydraulic servo.

In either the automatic shift mode or the manual shift mode, the manual valve can establish a D-range pressure, a 3rd speed range pressure, a 2nd speed range pressure, an L-range pressure, an N-range pressure, an R-range pressure and a P-range pressure. In order to achieve the individual gear stages, there are provided a 1–2 shift valve, a 2–3 shift valve, a 3–4 shift valve and 4–5 shift valve, which can be switched to feed the oil to the hydraulic servos of the aforementioned clutches and brakes individually.

Figure 1:
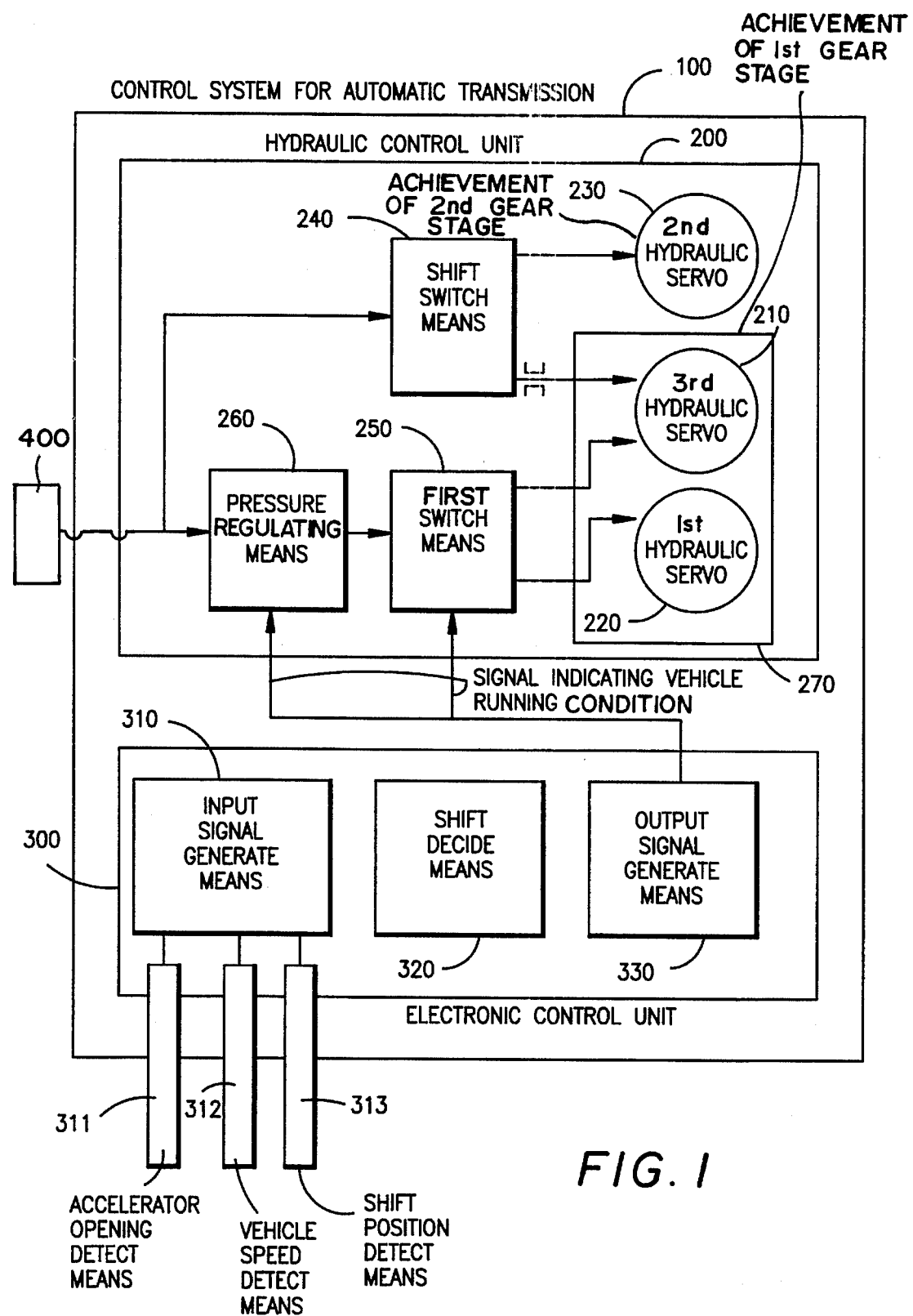
FIG. 1 is a block diagram showing the fundamental construction of the present invention.
Figure 2:
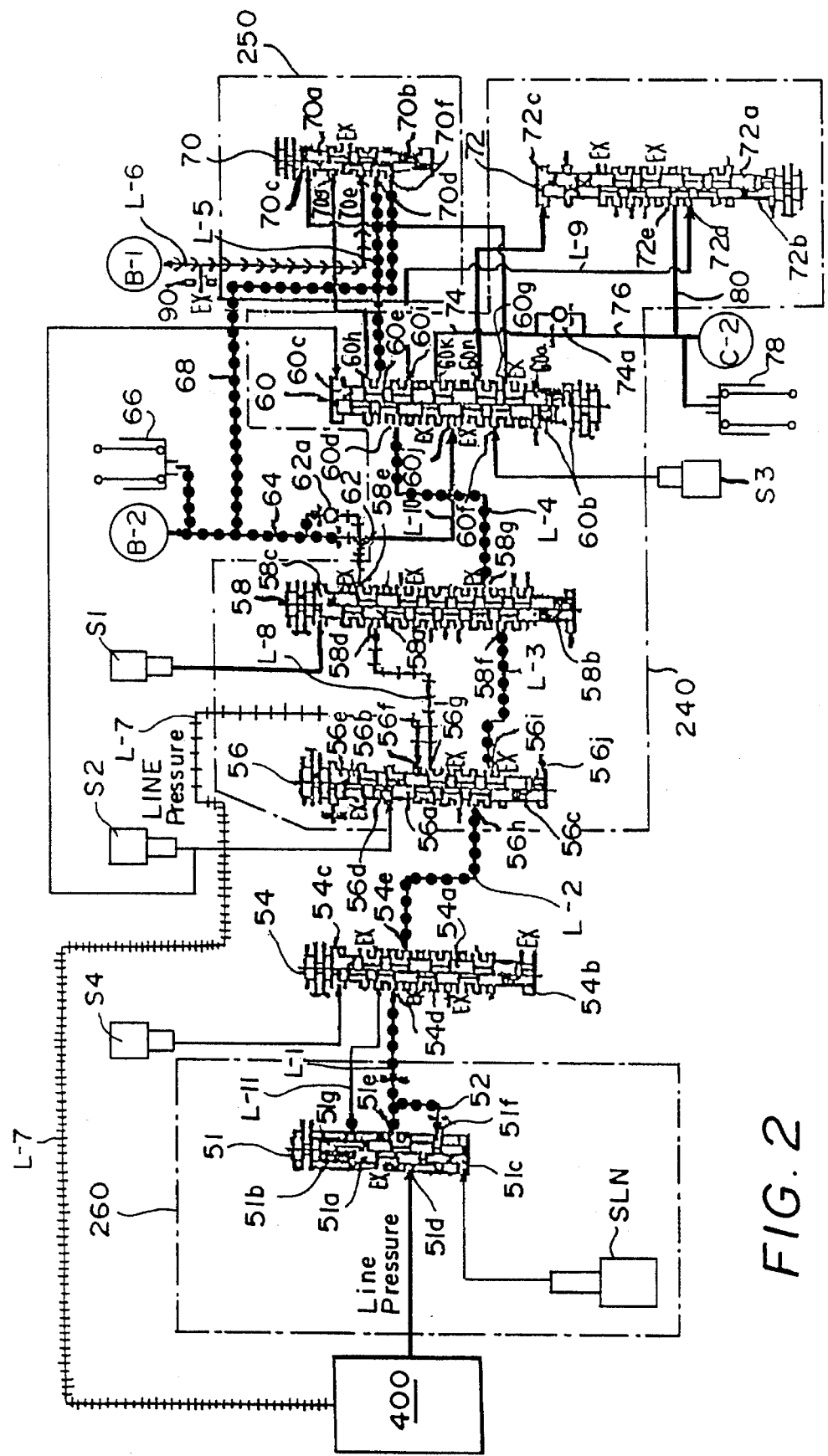
FIG. 2 is a hydraulic control circuit for an automatic transmission according to an embodiment of the present invention illustrating operation in 3rd speed.
Figure 3:
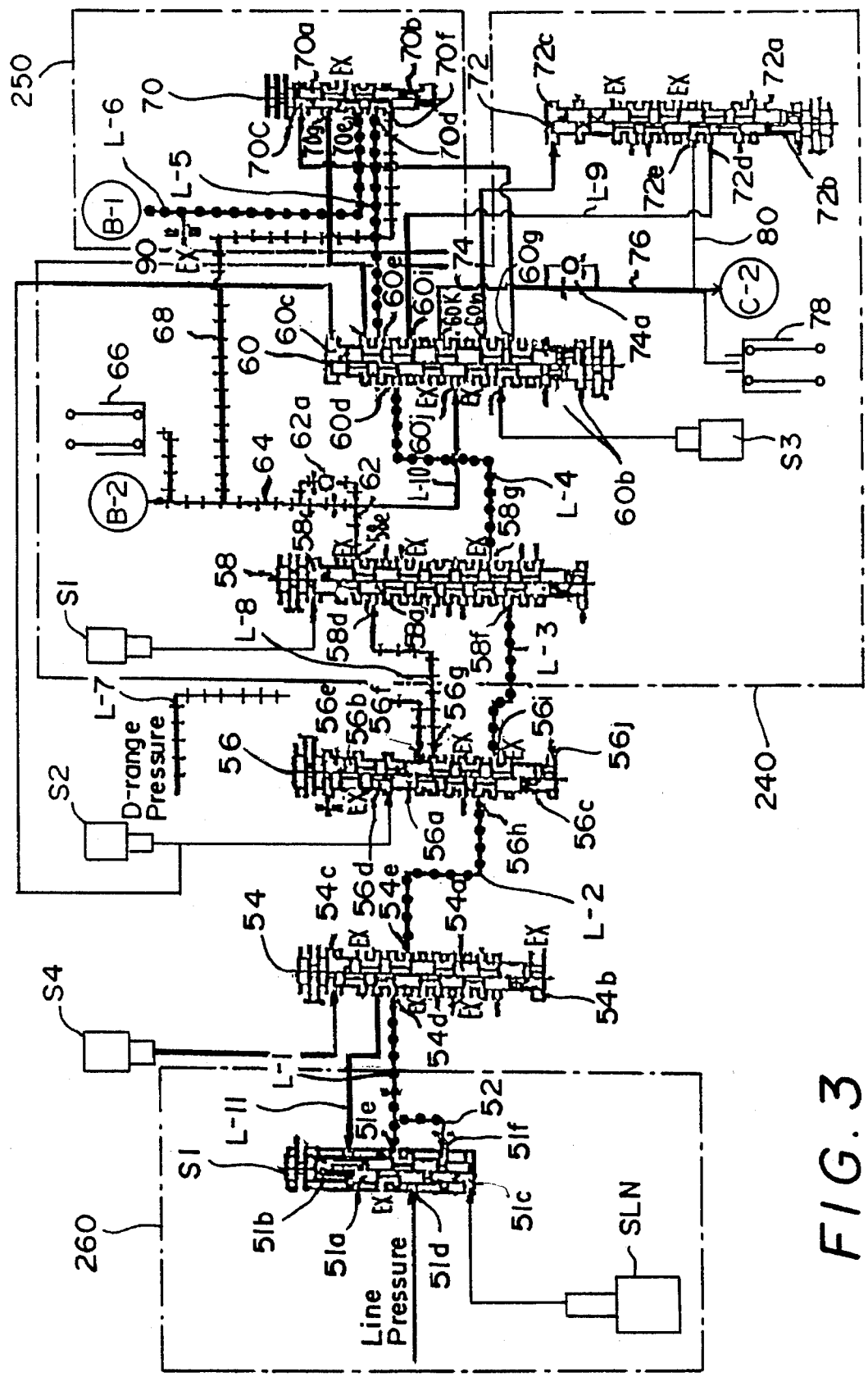
FIG. 3 shows the hydraulic control circuit of FIG. 2 in a different state.
Figure 4:
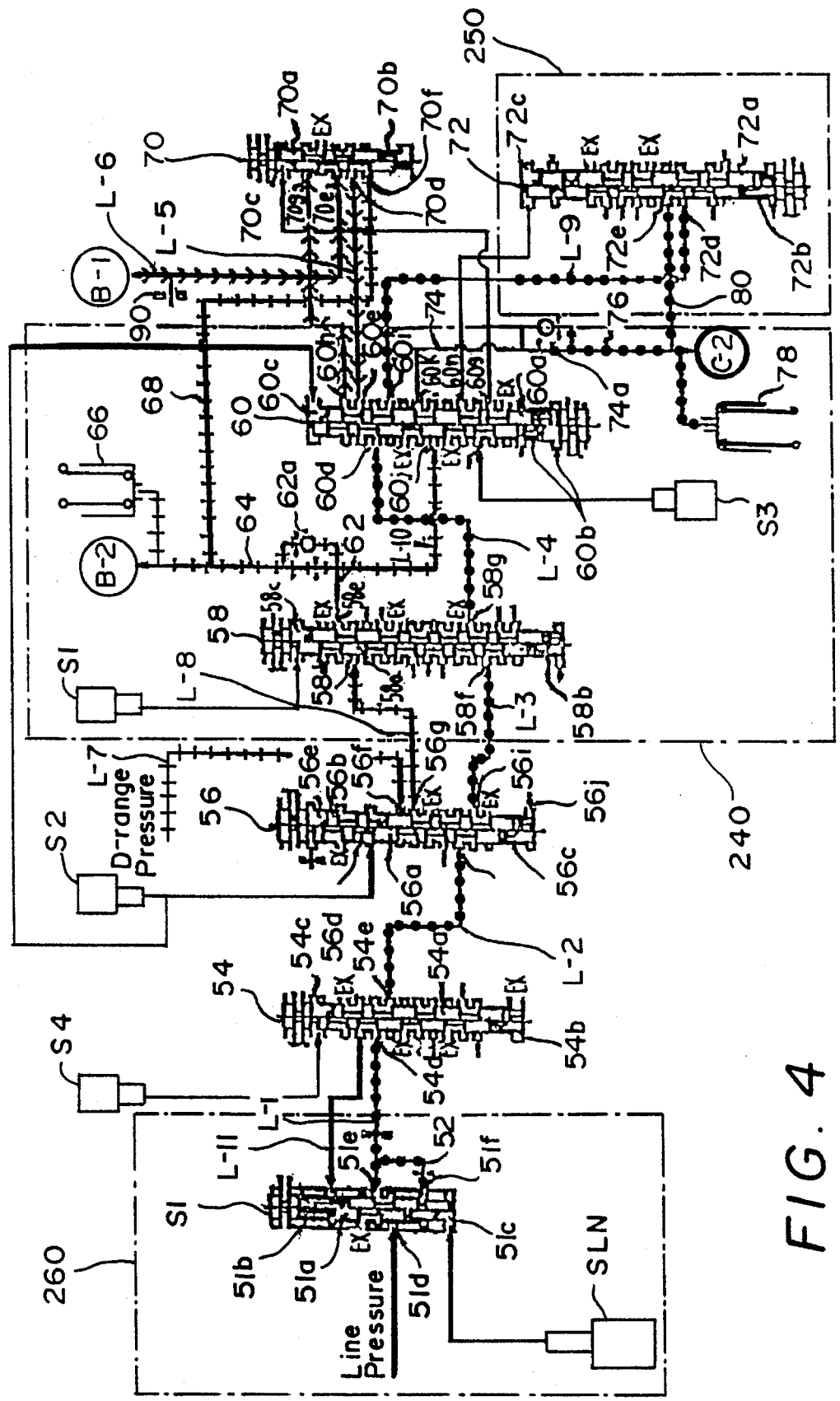
FIG. 4 shows the hydraulic control circuit of FIG. 2 in quick control at 4th speed.

FIGS. 2, 3 are diagrams showing a hydraulic circuit of a control system for an automatic transmission according to an embodiment of the present invention at the time of achieving 3rd speed, FIG. 4, and FIG. 7 is a diagram showing the operations in quick shift control.

In these figures, reference characters S1 to S4 designate first to fourth solenoids for establishing signal oil pressures for predetermined valves when they are turned on or off. Moreover, letters SLN designate a linear solenoid valve for establishing a predetermined signal oil pressure in response to an electric signal from the control system. This linear solenoid valve SLN feeds a regulated oil pressure to an accumulator control valve (not shown) and to a clutch pressure control valve 51 exemplifying pressure regulating means 260. The second brake B2, the fourth brake B4, the sixth brake BO, the second clutch C2 and the third clutch CO are individually equipped with hydraulic servos. Accumulators are individually connected with oil passages connected with the hydraulic servos to thereby regulate the changes in the pressures of the oil fed to the hydraulic servos. To the piston of each of the accumulators, is applied a predetermined accumulator back pressure, which is controlled by the aforementioned accumulator control valve.

Moreover, the oil at the back pressure controlling pressure, which is built up in the accumulator control valve, is also used as the oil fed to the aforementioned clutch pressure control valve 51.

Clutch pressure control valve 51 is equipped with a spool 51a, one end of which is engaged by a spring 51b and the other end of which receives the pressure within control oil chamber 51c. When a port 51d is fed with oil at line pressure while the control oil chamber 51c is fed with oil at a linear solenoid regulated pressure (linear solenoid valve SLN), the port 51d and port 51e are opened or closed in response to the linear solenoid pressure of the control oil chamber 51c so that the oil regulated to a control pressure is discharged from the port 51e. A port 51f is provided for feeding back the oil pressure from the port 51e through an orifice 52.

An engine brake control valve 54 exemplifies second switch means 270. This engine brake control valve 54 has a spool 54a, one end of which is engaged by a spring 54b and the other end of which receives the pressure within control chamber 54c. This control chamber 54c brings the spool 54a into right-hand and left-hand positions responsive to the signal oil pressure from the fourth solenoid valve S4. In the right-hand position, communication is provided between ports 54d and 54e to feed the oil from the aforementioned clutch pressure control valve 51 to a 1–2 shift valve 56.

This 1–2 shift valve 56 is equipped with a spool 56a and a 56b. The spool 56a has its one end contacted by a spring 56c, and control oil chambers 56d and 56e are formed between the spool 56a and the plunger 56b and at the other end of the plunger 56b. The control oil chamber 56d is fed with the signal oil pressure from the second solenoid valve S2.

The 1–2 shift valve 56 takes a left-hand position in the 2nd to 5th speeds and a right-hand position in 1st speed. In the left-hand position, the 1–2 shift valve 56 has communication between its ports 56f and 56g to feed D-range pressure to a 2–3 shift valve 58 and to servo B-4 and between its ports 56h and 56i to feed the pressure from the aforementioned engine brake control valve 54 to the 2–3 shift valve 58. The 1–2 shift valve 56 is further provided with a control oil chamber 56j at its spring biased end.

The 2–3 shift valve 58 is equipped with a spool 58a, which has its one end urged by a spring 58b and its other end receiving pressure within control oil chamber 58c. This control oil chamber 58c brings the spool 58a into right-hand and left-hand positions by receiving the signal oil pressure from the first solenoid valve S1.

Specifically, the 2–3 shift valve 58 takes the left-hand position in the 1st and second speeds and the right-hand position in the 3rd to 5th speeds. In the right-hand position, the 2–3 shift valve 58 has communication between its ports 58d and 58e to feed the oil at D-range pressure from the aforementioned 1–2 shift valve 56 to a hydraulic servo B-2 and between its ports 58f and 58g to feed the oil from port 56i of the 1–2 shift valve 56 to a 3–4 shift valve 60.

The aforementioned port 58e is connected to a D-range oil passage 62, and the oil at the D-range pressure discharged to the D-range oil passage 62 is throttled by an orifice 62a with a check ball and is fed via an oil passage 64 to the hydraulic servo B-2. To the oil passage 64, there is connected an accumulator 66 which damps the rise in the pressure of the oil fed to the hydraulic servo B-2. The aforementioned orifice 62 having the check ball is provided for stabilizing the amount of oil fed to the accumulator 66 and the hydraulic servo B-2. Incidentally, a later-described quick shift controlling oil passage 68 is connected between the orifice 62a having the check ball and the hydraulic servo B-2.

The 3-4 shift valve 60 is equipped with a spool 60a, which has its one end urged by a spring 60b and its other end receiving pressure within control oil chamber 60c. This control oil chamber 60c brings the spool 60a into right-hand and left-hand positions responsive to the signal oil pressure from the second solenoid valve S2.

Specifically, the 3-4 shift valve 60 takes the left-hand position in the 1st to 3rd speeds and the right-hand position in the 4th and 5th speeds. In the left-hand position, the 3-4 shift valve 60 has communication between its ports 60d and 60e to feed the oil from the aforementioned 2-3 shift valve 58 to a B-1 timing valve 70, which exemplifies a first switch means, and between its ports 60f and 60g to feed the signal oil pressure from the third solenoid valve S3 to the B-1 timing valve 70.

In the right-hand position, on the other hand, the 3-4 valve 60 has communication between the port 60e and a port 60h and between the port 60d and a port 60i to feed the oil from the aforementioned 2-3 shift valve 58 to a 4-5 shift valve 72. Moreover, communication between ports 60j and 60k is provided to feed the D-range pressure from the aforementioned 2-3 shift valve 58 to a hydraulic servo C-2 for the second clutch C2, and communication between the port 60f and a port 60m is provided to feed the signal oil pressure of the third solenoid valve S3 to the 4-5 shift valve 72. At this time, moreover, communication is established between the port 60g and a drain port EX.

The aforementioned port 60k is connected to a D-range oil passage 74 so that the oil at the D-range pressure discharged to the oil passage 74 is throttled by an orifice 74a having a check ball and fed through an oil passage 76 to the hydraulic servo C-2. To this oil passage 76, there is connected an accumulator 78 which damps the rise in the pressure of the oil fed to the hydraulic servo C-2. Incidentally, a later-described quick shift controlling oil passage 80 is connected between the aforementioned orifice 74a having the check ball and the hydraulic servo C-2.

The B-1 timing valve 70 is equipped with a spool 70a, which has its one end urged by a spring 70b and it other end receiving pressure within control oil chamber 70c. This control oil chamber 70c brings the spool 70a into right-hand and left-hand positions responsive to the signal oil pressure of the third solenoid valve S3 through the aforementioned 3-4 shift valve 60.

Specifically, in the right-hand position, the B-1 timing valve 70 has communication between its ports 70d and 70e to connect the aforementioned 3-4 shift valve 60 and the hydraulic servo B-1 of the first brake B1 and between a port 70g and the drain port EX. In the left-hand position, the B-1 timing valve 70 has communication between its port 70d and port 70f and between its port 70e and the drain port EX to discharge the oil of the hydraulic servo B-1.

The 4-5 shift valve 72 is equipped with a spool 72a, which has its one end urged by a spring 72b and its other end receiving pressure within control oil chamber 72c. This control oil chamber 72c brings the spool 72a into the left-hand position in the 1st to 4th speeds and into the right-hand position in the 5th speed by receiving the signal oil pressure of the third solenoid valve S3 through the aforementioned 3-4 shift valve 60.

Specifically, in the left-hand position, the 4-5 shift valve 72 has communication between its ports 72d and 72e to feed the oil of the aforementioned 3-4 shift valve 60 to the hydraulic servo C-2 via the aforementioned quick shift controlling oil passage 80.

In the hydraulic circuit thus constructed, in 3rd speed in D-range, the engine brake control valve 54 is positioned in the left-hand position by releasing the signal oil pressure which is fed to the control oil chamber 54c from the fourth solenoid valve S4. The clutch pressure control valve 51 has its control oil chamber 51c fed with oil pressure corresponding to the accumulator back pressure in the D-range from the linear solenoid valve SLN, to regulate the oil pressure in the port 51e. Since, however, the clutch pressure control valve 51 has its oil chamber 51g fed with the oil via an oil passage L-11, it is fixed in the right-hand position so that the oil does not have its pressure regulated but has minimal flow. On the other hand, the 1-2 shift valve 56 is caused to take the left-hand position by its control oil chamber 56j receiving oil at the line pressure, and the 2-3 shift valve 58 is caused to take the left-hand position by its control oil chamber 58c receiving oil at the signal oil pressure from the first solenoid valve S1. Moreover, the 3-4 shift valve 60 is caused to take the left-hand position by discharge of oil from its control oil chamber 60c, and B-1 timing valve 70 is caused to take the right-hand position by discharge of oil from its control oil chamber 70c through the third solenoid valve S3.

As a result, the oil of the hydraulic servo B-1 is discharged from a drain orifice 90 partly because oil passages L-6, L-5, L-4, L-3 and L-2 communicate and partly because the engine brake control valve 54 has its port 54e closed. On the other hand, oil at the D-range pressure is fed to the hydraulic servo B-2 acting as a first hydraulic servo 210 by way of an oil passage L-7, an oil passage L-8, the D-range pressure oil passage 62, the orifice 62a having the check valve, and the oil passage 64. Thus, the first gear stage or the 3rd speed is achieved.

In case of running at an extremely low temperature, for example, with the automatic transmission 11 thus constructed, the oil pressure changes with the change in temperature so that the shifting response is slower than usual. Therefore, shifting response should be prevented from dropping with a drop in the temperature.

Prevention of a drop in shift response will be described for the case wherein the shifting response is enhanced when the first gear stage or the third speed is selected in the manual shift mode by operating the shift lever.

In order to raise or drop the shifting response, the shift lever, for example, is equipped with a select switch which is turned on or off so that the control unit selects either ordinary shift control or quick shift control to switch the shifting response.

Specifically, in quick shift control, the control system establishes the control pressure in an oil passage L-1 by sending an electric signal to the linear solenoid valve SLN to feed the oil under the linear solenoid pressure to the control oil chamber 51c of the clutch pressure control valve 51 to thereby regulate the line pressure.

At the same time, the third solenoid valve S3 is turned on to bring the B-1 timing valve 70 into the left-hand position, and the fourth solenoid valve S4 is turned off to bring the engine brake control valve 54 into the right-hand position.

Moreover, the remaining valves take the same positions as in ordinary shift control. The 1-2 shift valve 56 is caused to take the left-hand position by having its control oil chamber 56j fed with the oil at the line pressure, and the 2-3 shift valve 58 is caused to take the left-hand position by having its control oil chamber 58c fed with the oil at the signal oil pressure from the first solenoid valve S1. Moreover, the 3-4 shift valve 60 is caused to take the left-hand position by discharge of oil from its control oil chamber 60c through the second solenoid valve S2.

In this case, the aforementioned control pressure is fed to the quick shift controlling oil passage 68 via the oil passage L-1, L-2, L-3, L-4 and L-5. On the other hand, oil at the D-range pressure is sent as in ordinary shift control to the oil passage 64 through the oil passage L-7, the oil passage L-8, the D-range pressure oil passage 62 and the orifice 62a having the check valve. As a result, the hydraulic servo B-2 or the first hydraulic servo 210 is fed with the control pressure, so that its oil pressure is quickly raised.

In 2nd speed in the D-range, a similar quick shift control can be accomplished in a similar manner by regulating the pressures of oil fed to the hydraulic servo of the third brake B3 a second, hydraulic servo 230 of the fourth brake B4, as shown in FIG. 7. In this case the third brake B3 is engaged when the braking is effected by the engine.

Figure 8:
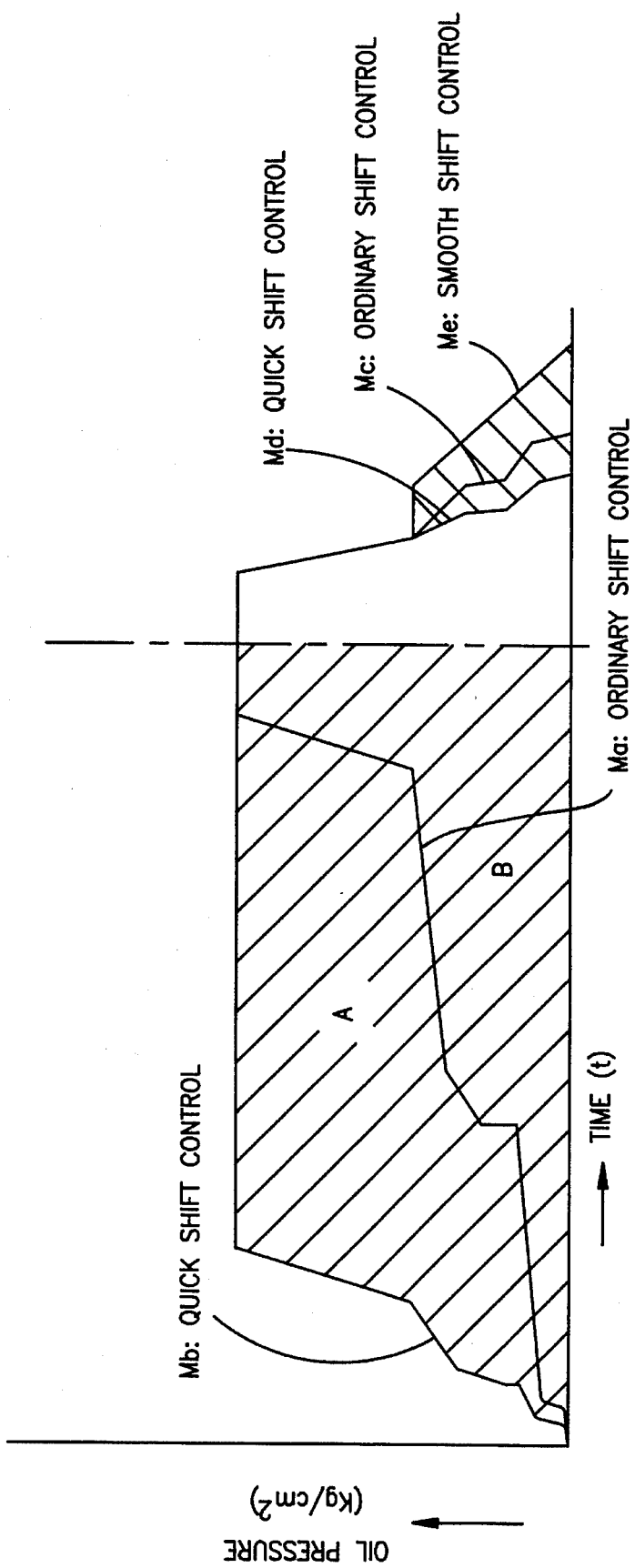
FIG. 8 is a graph comparing the oil pressures in a hydraulic servo in ordinary shift control with those in quick shift control.

In FIG. 8 curve Ma is an oil pressure curve for an upshift in ordinary shift control; curve Mb is an oil pressure curve for an upshift by the quick shift control; curve Mc is an oil pressure curve for a downshift in ordinary shift control; curve Md is an oil pressure curve for a downshift in quick shift control; and curve Me is an oil pressure curve for a downshift in smooth shift control.

Contrary to the quick shift control, the aforementioned smooth shift control can drop the shifting response by controlling the electric signal of the aforementioned linear solenoid valve SLN. Thus, by controlling the electric signal of the linear solenoid valve SLN to regulate the oil pressure in the aforementioned quick shift controlling oil passage 68, the pressure fed to the hydraulic servo B-2 and the pressure released from the hydraulic servo B-2 can be regulated to achieve upshift by quick shift control as defined in region A, upshift by smooth shift control as defined in region B, downshift by quick shift control as defined in region C and downshift by smooth shift control as defined in region D.

Incidentally, in the hydraulic circuit thus constructed, the oil at control pressure is fed through the aforementioned B-1 timing valve 70 to the quick shift controlling oil passage 68, but the B-1 timing valve 70 can be switched to feed oil at the control pressure via the oil passage L-6 to the hydraulic servo B-1 or the second hydraulic servo.

In ordinary shift control, the oil at D-range pressure can be fed either (1) to the hydraulic servo B-2 via the oil passages L-7 and L-8, the D-range pressure oil passage 62, orifice 62a having the check valve and the oil passage 64 to engage the second brake B2 or the first hydraulic servo or (2) to the hydraulic servo B-1 via the B-1 timing valve 70 and the oil passage L-6 to engage the first brake B-1 or the second hydraulic servo, so that the vehicle can run while being braked by the engine.

Ordinary shift control and the quick shift control in 4th speed in the D-range will now be described.

In ordinary shift control, the control system sends an electric signal to the linear solenoid valve SLN to feed oil at the linear solenoid pressure to control oil chamber 51c of the clutch pressure control valve 51 so that the line pressure is regulated to establish the control pressure in the oil passage L-1.

When the fourth solenoid valve S4 is turned on, the engine brake control valve 54 is caused to take the left-hand position by discharging the oil from its control chamber 54c. As a result, the oil of the oil passage L-1 is returned via the oil passage L-11 to the clutch pressure control valve 51 to move spool 51a to the right-hand position.

Moreover, the third solenoid valve S3 is turned on to discharge oil from the control chamber 72c of the 4–5 shift valve 72 through the 3–4 shift valve 60 so that the B-1 timing valve 70 takes the right-hand position.

Moreover, the 1–2 shift valve 56 is caused to take the left-hand position by having its control chamber 56j fed with the oil under the line pressure, and the 2–3 shift valve 58 is caused to take the right-hand position by receiving the signal oil pressure from the first solenoid valve S1. The 3–4 shift valve 60 is caused to take the right-hand position by having its control chamber 60c fed with the oil under the signal oil pressure from the second solenoid valve S2, and the 4–5 shift valve 72 is caused to take the left-hand position by discharging the oil from its control chamber 72c through the 3–4 shift valve 60.

In this case, the D-range pressure is fed to (1) the oil passage 64 via the oil passages L-7 and L-8, the D-range pressure oil passage 62 and the orifice 62a having the check ball and (2) to the oil passage 76 via the D-range pressure oil passage 74 and the orifice 74a having the check ball. As a result, the hydraulic servo B-2 of the second brake B2 and the hydraulic servo C-2 of the second clutch C2 are fed with D-range pressure to achieve the 4th speed.

Like the quick shift control in 3rd speed, if the switch for selecting the quick shift control is depressed by the driver, the control system signals the linear solenoid valve SLN to feed the linear solenoid pressure to the control chamber 51c of the clutch pressure control valve 51 so that the line pressure is regulated to establish the control pressure in the oil passage L-1.

When the third solenoid valve S3 is turned on, the control oil chamber 72c of the 4–5 shift valve 72 is relieved of oil pressure through the 3–4 shift valve 60 so that the B-1 timing valve 70 takes the right-hand position, and the engine brake control valve 54 is in the right-hand position due to its control oil chamber 54c receiving signal oil pressure from the fourth solenoid valve S4.

Furthermore, the remaining valves are in the same positions as in ordinary shift control. Specifically, the 1–2 shift valve 56 is in the left-hand position due to its control oil chamber 56j receipt of line pressure, and the 2–3 shift valve 58 is in the right-hand position due to its control oil chamber 58c receipt of signal oil pressure from the first solenoid valve S1. Furthermore, the 3–4 shift valve 60 is in the right-hand position due to its control pressure 60c receipt of signal oil pressure from the second solenoid valve S2, and the 4–5 shift valve 72 is in the left-hand position due to drainage of control chamber 72c through the 3–4 shift valve 60.

The aforementioned control pressure is fed to the quick shift controlling oil passage 80 via the oil passages L-1, L-2, L-3, L-4 and L-9. On the other hand, the D-range pressure is fed, as in ordinary shift control, to the oil passage 64 via the oil passages L-7 and L-8, the D-range pressure oil passage 62 and the orifice 62a having the check ball and to the oil passage 76 via the oil passage L-10, the D-range pressure oil passage 74 and the orifice 74a having the check ball. As a result, the hydraulic servo B-2 of the second brake B2 is fed with D-range pressure, and the hydraulic servo C-2 or hydraulic servo means 270 of the second clutch C2 is fed with the control pressure, so that the oil pressure is quickly raised. At this time, the braking by the engine is instantly effected because there is no one-way clutch. In this case, the 4–5 shift valve 72 plays the role of the first switch means 250.

At this time, the B-1 timing valve 70 is in the right-hand position, and the 3–4 shift valve 60 has its ports 60h and 60e communicating with each other. As a result, the oil in the hydraulic servo B-1 of the of the first brake B-1 is discharged via the oil passages L-6 and L-5.

The aforementioned quick shift control can also be applied to the 5th speed in the D range, whereupon the hydraulic servo of the sixth brake BO is fed with the control pressure, so that the oil pressure is quickly raised.

Figure 9:
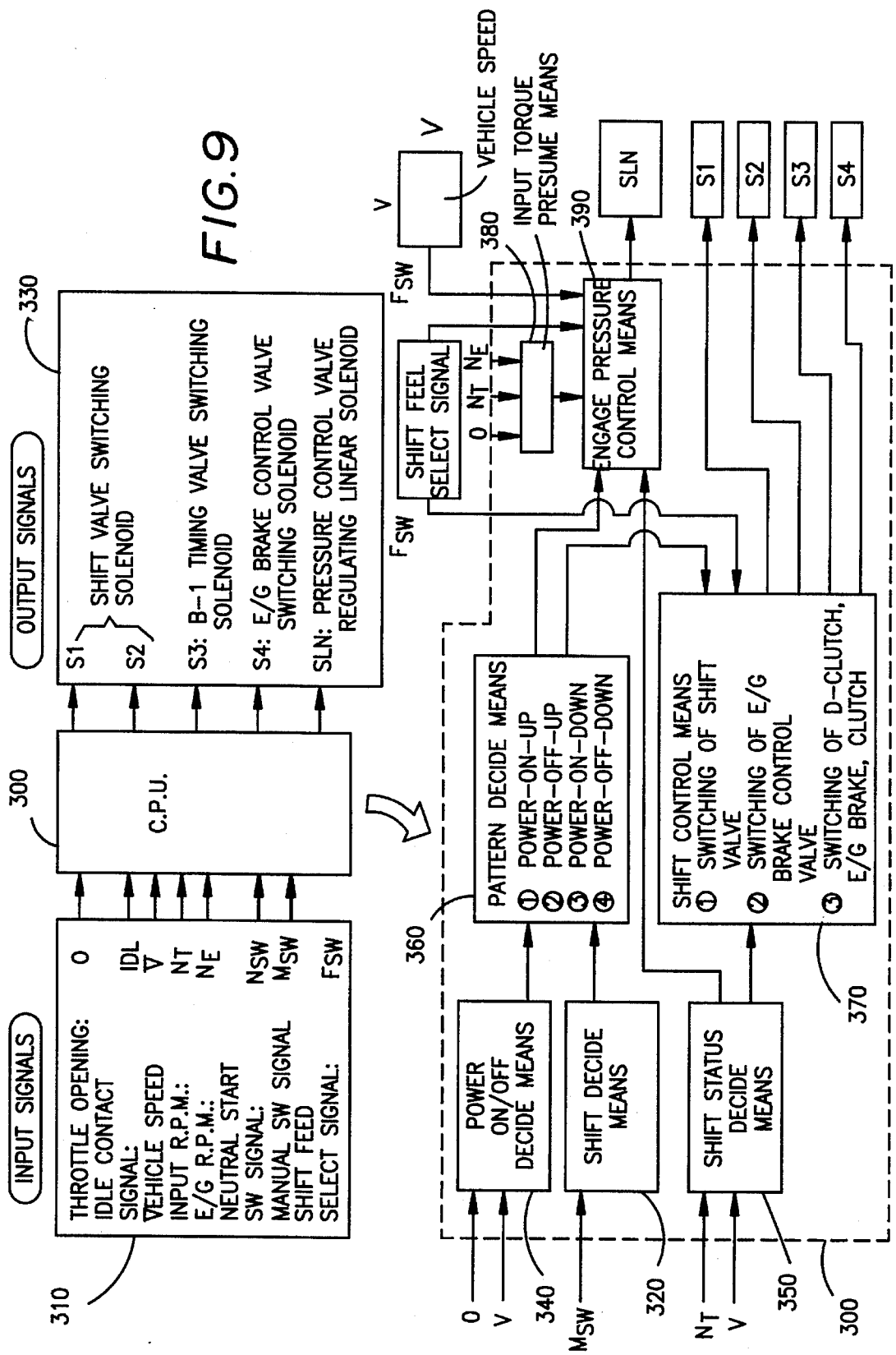
FIG. 9 is a block diagram showing an electronic control unit of the present invention.

Next, a block diagram of an electronic control system 300 will be described with reference to FIG. 9.

The reference numeral 300 designates the electronic control system; numeral 310 designates input signal generating means for the electronic control system; and numeral 330 designates output signal generating means for the electronic control system. Numeral 320 designates shift decision means for deciding the upshift and downshift on the basis of a manual SW signal $M_{SW}$, and numeral 340 designates power ON/OFF decision means for deciding the status of an accelerator opening on the basis of a throttle opening θ and vehicle speed V. Numeral 350 designates shift status decision means for deciding a shift status on the basis of input R.P.M. and the vehicle speed V. Numeral 360 designates pattern decision means for choosing one of four patterns, i.e., the power-ON-up, power-OFF-up, power-ON-down and power-OFF-down patterns, on the basis of the signals coming from the power ON/OFF decision means 340 and the shift decision means 320. Numeral 370 designates shift valve switch control means for sending shift valve switch signals to the solenoids $S_1$ to $S_0$ on the basis of the signal coming from the pattern decision means 360 and the shift feel select signal inputted by the driver. Numeral 380 designates input torque calculating means for calculating the input torque on the basis of the throttle opening θ, the input R.P.M. $N_T$ and engine R.P.M. $N_2$. Numeral 390 designates engage pressure control means for sending a signal to the linear solenoid valve SLN to control the pressure control valve 51 on the basis of the signal from the input torque calculating means 380, the select pattern signal from the pattern decision means 360, the shift signal from the shift status decision means 350, the shift feel select signal $F_{SW}$, and the vehicle speed signal V.

Next, the quick control will be described.

Figure 10:
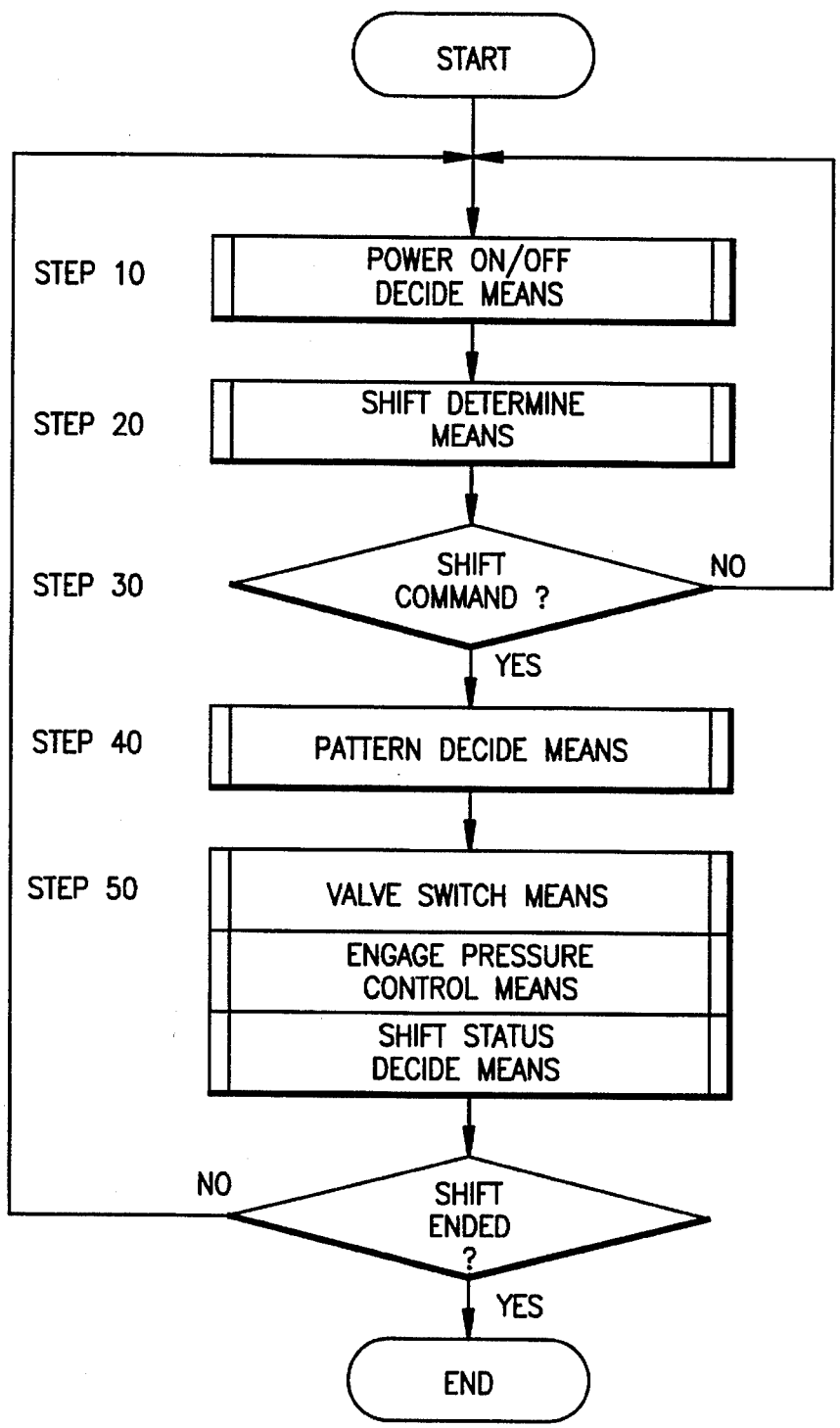
FIG. 10 is a general flow chart illustrating a quick control in a control system for an automatic transmission according to the present invention.

FIG. 10 is a flow chart showing quick control according to the present invention, and FIGS. 11 to 14 are flow charts showing the subroutines of the quick control.

Figure 11:
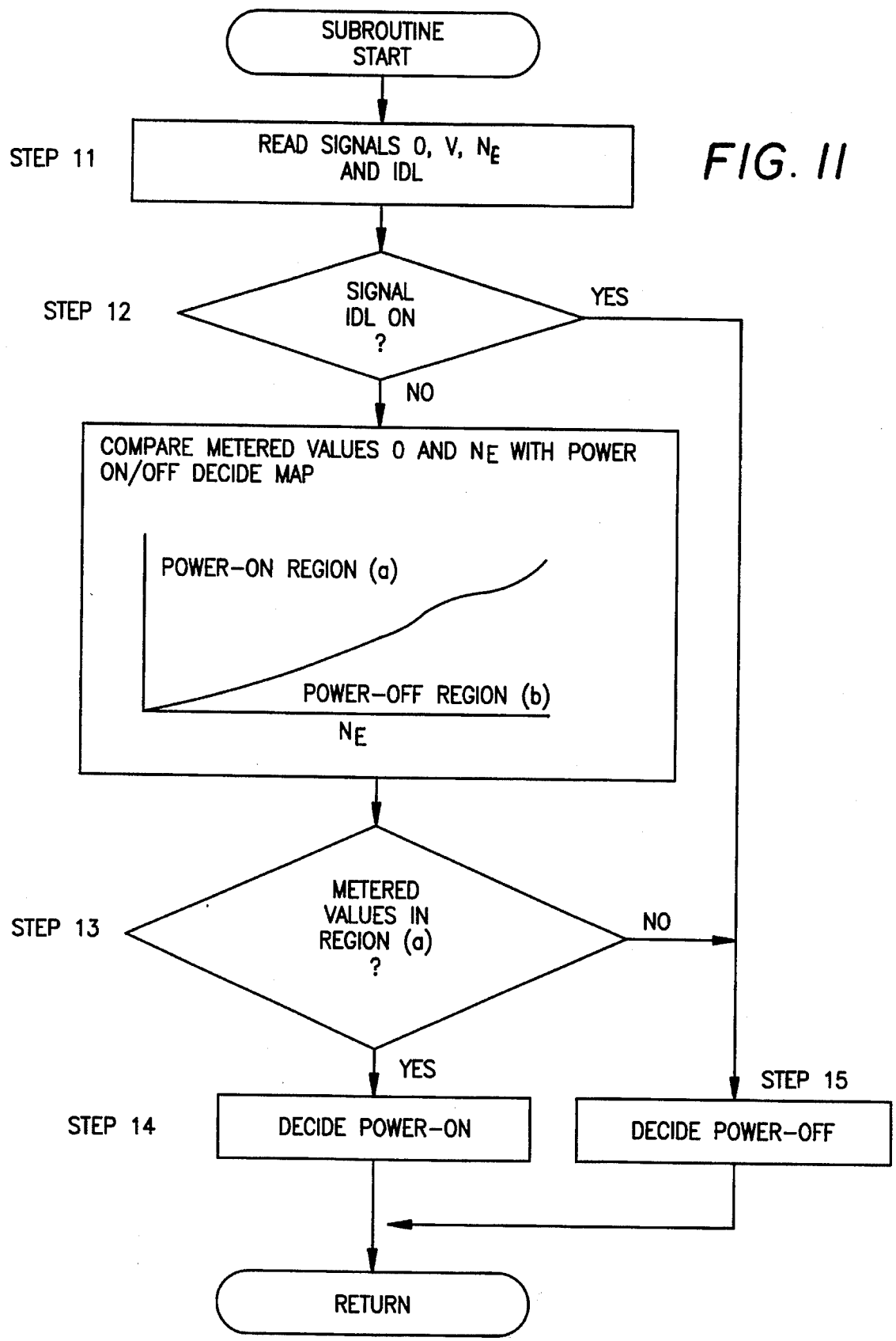
FIG. 11 is a flow chart illustrating a power ON/OFF decision means in a control system for an automatic transmission according to the present invention.

When quick control is started, it advances first to the power ON/OFF decision at Step 10. The detail of this power ON/OFF decide means is shown in FIG. 11. First of all, the throttle opening θ, the vehicle speed V, the engine R.P.M. $N_Z$ and the idle setting signal IDL are read, and the subroutine advances to Step 12. If it is decided at Step 12 that the idle setting signal IDL is ON, the subroutine advances to Step 15, where power-OFF is decided, and the subroutine is returned. If it is decided that the idle setting signal IDL is OFF, the subroutine proceeds to Step 13. At Step 13, the throttle opening θ and the engine R.P.M. are applied to the power ON/OFF decide map (plotting the relation between the metered values $N_Z$ and θ) to decide whether the coordinates ($N_Z$, θ) fall within the power-ON region (a) or the power-OFF-region (b). If the answer is the power-OFF-region (b), the subroutine advances to Step 15, where power-OFF is decided, and the subroutine is returned. If the answer is the power-ON-region (a), on the other hand, the subroutine advances to Step 14, where the power-ON is decided, and the subroutine is returned.

Figure 12:
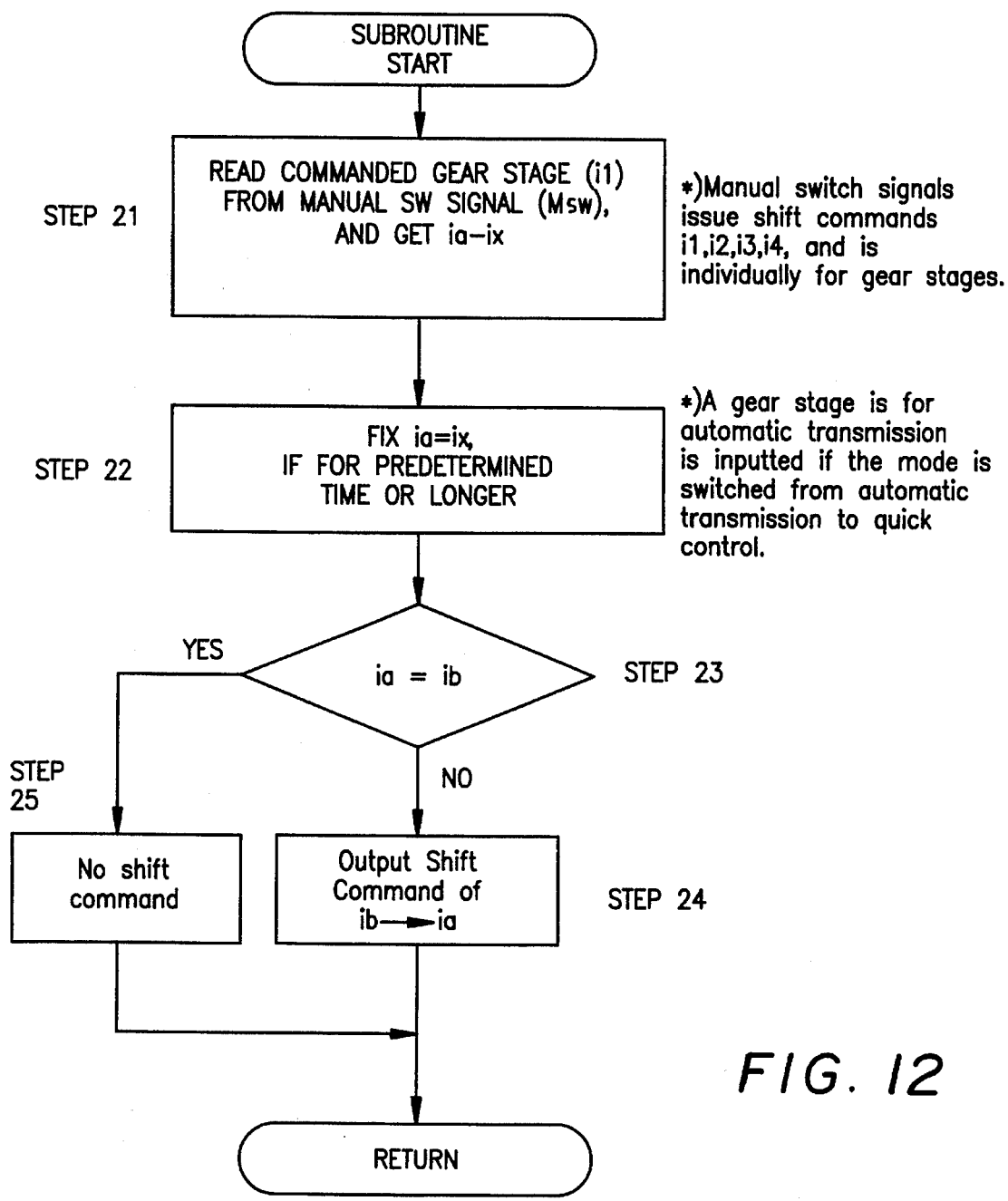
FIG. 12 is a flow chart illustrating shift decision means in a control system for an automatic transmission according to the present invention.

When the decision of the power ON/OFF of Step 10 is thus ended, the process then proceeds to the shift decide means 320 of Step 20. The detail of the shift decide means 320 at Step 20 is shown in FIG. 12. When the shift decide means is started, at Step 21, the commanded gear stage $i_X$ is read from the manual switch signal $M_{SW}$ or the input signal for issuing shift commands, $i_1$, $i_2$, $i_3$, $i_4$ and $i_5$ individually for gear stages, to set $i_a = i_X$. Next, the subroutine advances to Step 22, where it is decided that a shift is intended if $i_a = i_X$ continues, then $i_a = i_X$ is fixed. Moreover, the gear stage before the $i_a$ is fixed is designated at $i_b$, and the gear stages $i_a$ and $i_b$ are compared in Step 23. If $i_a = i_b$, the subroutine advances to Step 25, where it is decided that no shift is commanded, and is then returned. If $i_a \ne i_b$, on the other hand, the subroutine advances to Step 24, at which a shift command of $i_b \rightarrow i_a$ is output, and is then returned. In case, however, the mode is switched from the automatic shift mode to the quick control mode, the gear stage $i_b$ inputs the gear stage in the automatic mode and is decided at Step 23. Moreover, FIG. 12 exemplifies the method of selecting the gear stage in response to the manual switch signal. In addition to the foregoing, the shift decide means can also use either the so-called type shift command" or the shift pattern of the automatic mode. There may also be incorporated, into the present flow chart, shift inhibit logic which acts as a protecting function for engine overrunning, although not described.

Figure 13:
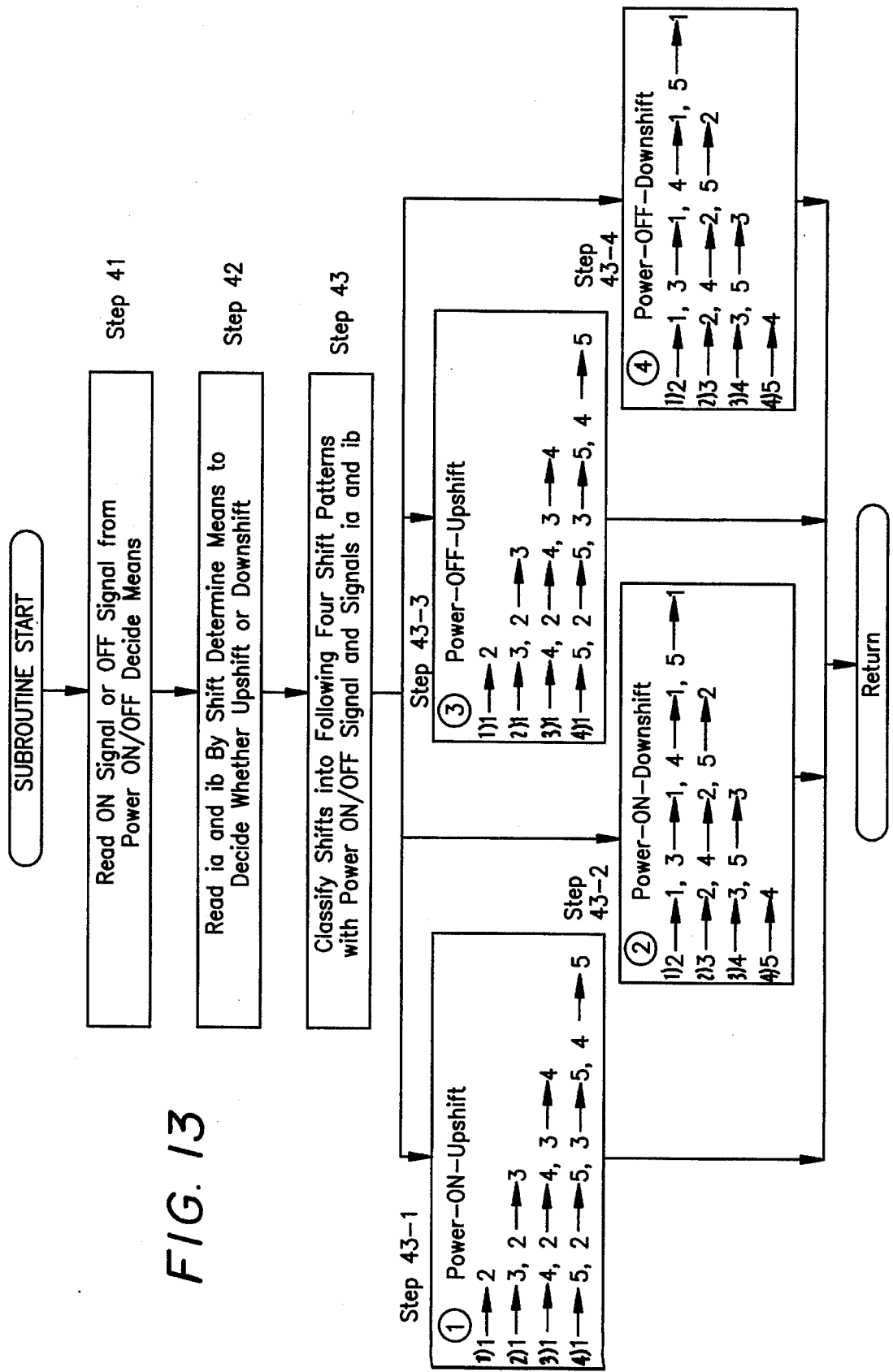
FIG. 13 is a flow chart illustrating pattern decision in a control system for an automatic transmission according to the present invention.

Next, it is decided in Step 30 by the shift decide means of Step 20 whether or not the shift command is output. If NO, the flow is returned to Step 10. If YES, on the other hand, the process proceeds to the pattern decide means 360 of Step 40. As shown in FIG. 13, the pattern decide means 360 reads at Step 41 the ON signal or OFF signal output from the power ON/OFF decide means 340 of Step 10, and the subroutine advances to Step 42. At Step 42, the gear stages $i_a$ and $i_b$ are read by the shift decide means 320 of Step 20 to decide upshift or downshift. At Step 43, moreover, with the power ON/OFF signal and the $i_a$ and $i_b$ signals, it is decided which of the four patterns of the power-ON-upshift of Substep 43-1, the power-ON-downshift of Substep 43-2, the power-OFF-upshift of Substep 43-3 and the power-OFF-downshift of Substep 43-4 the shift belongs to, and the subroutine is then returned. Incidentally, in the pattern decide means subroutine of Step 40 of the present embodiment, the shifts are roughly classified into those four shift patterns. In addition, it is possible to set the pattern for a shift through an intermediate gear stage for a skip (e.g., 5th→3rd speeds), a shift without the braking by the engine, or a shift for establishing a high torque by engaging the D-range clutch and the engine brake clutch simultaneously.

Figure 14:
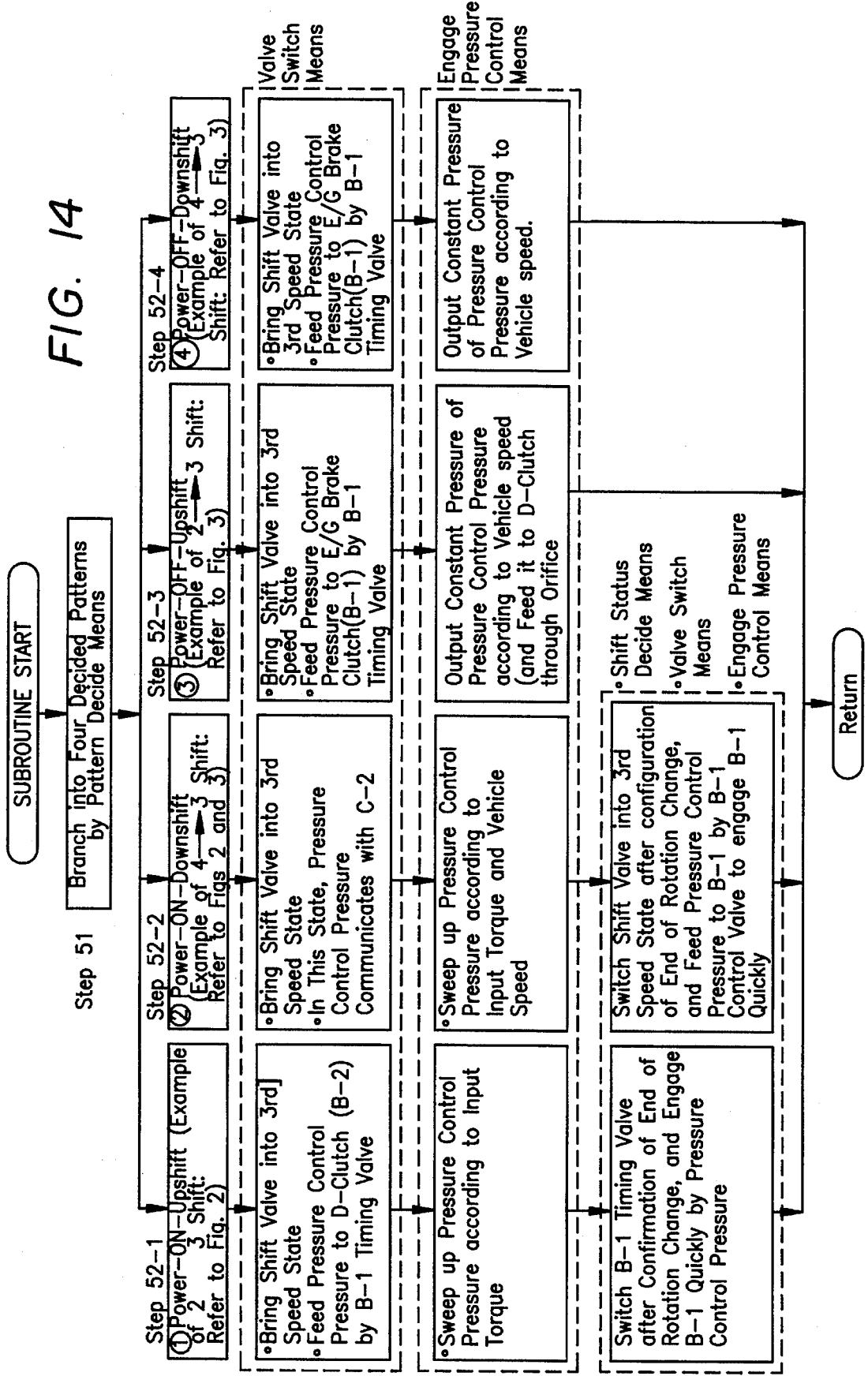
FIG. 14 is a flow chart illustrating shift valve control, engage pressure control and shift status decision in a control system for an automatic transmission according to the present invention.

Next, the process proceeds to Step 50, where the subroutine is started by branching the shifts individually according to the pattern decided in Step 40, as shown in FIG. 14. At first, it is decided at Step 51 which of the four patterns the shift belongs to, and the subroutine advances to Substeps corresponding to the individual patterns.

Figure 15A:
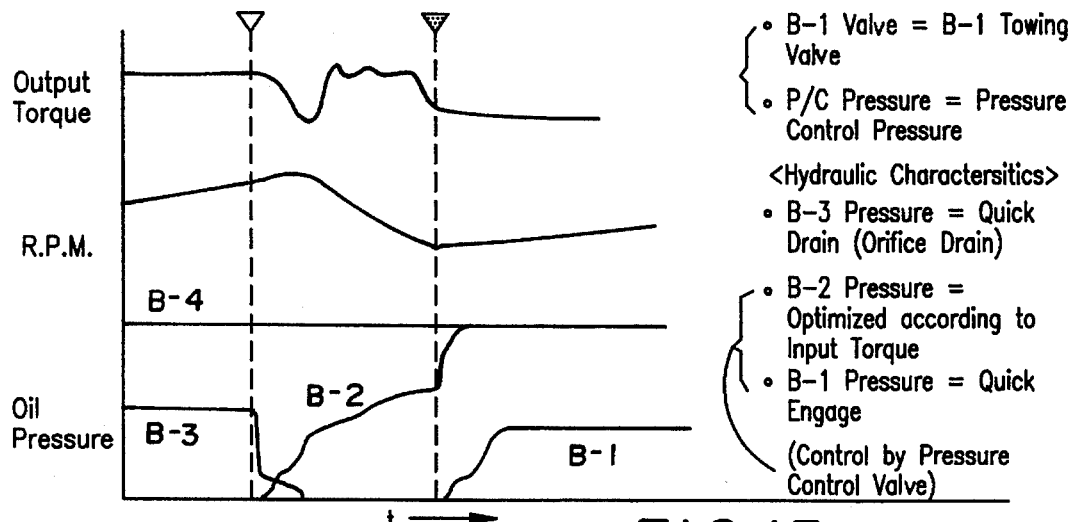
FIG. 15 is a time graph of 2–3 power-ON upshift and 4–3 power-ON downshift in an automatic transmission of the present invention.
Figure 15B:
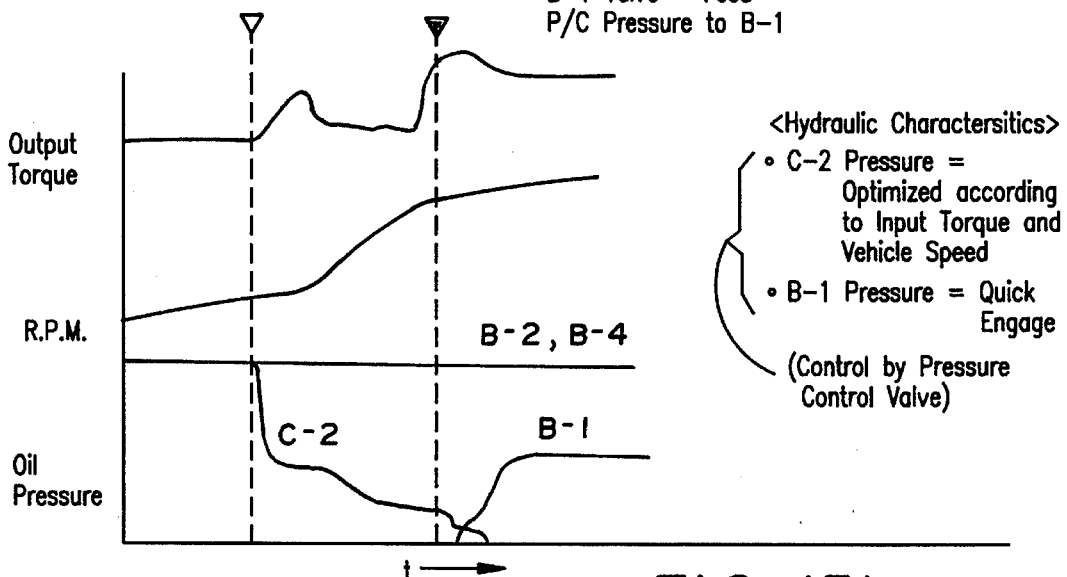

First of all, the power-ON-upshift advances to Substep 52-1, as will be described taking the 2–3 shift by way of example. At first, the 2–3 shift valve is switched to the 3rd speed state or the first gear stage by shift switch means 240. Specifically, the engine brake control valve 54 and the 2–3 shift valve 58 shown in FIG. 2 take their right-hand positions, and the 1–2 shift valve 56 and the 3–4 shift valve 60 take their left-hand positions. As a result the B-1 timing valve 70 takes the left-hand position, the control pressure is fed to the D-range clutch (B-2) or third hydraulic servo 210. Thus, the feed of the B-2 pressure is quickly ended by the clutch control. By the engage pressure control means 390, moreover, the control pressure is regulated according to the input torque. After it has been confirmed by the shift status decide means 350 that the rotation change is ended, namely after the shift end, the B-1 timing valve 70 is switched to the right-hand position to engage the B-1 hydraulic servo or a first hydraulic servo 220 quickly by the control pressure, and the subroutine is then returned. This is because it is intended to always effect braking by the engine in power-OFF. Incidentally, the time chart for the power-ON upshift is shown at 1 in FIG. 15.

When it is decided that the shift is the power-ON downshift, the subroutine advances to Substep 52-2. Here will be described the 4–3 shift by way of example. At first, the shift valve 60 is set in the 4th speed state by the shift switch means 240. As shown in FIG. 4, the engine brake control valve 54, the 2–3 shift valve 58 and the 3–4 shift valve 60 take their right-hand positions, and the 1–2 shift valve 56 and the 4–5 shift valve 72 take their left-hand positions. In this state, the control pressure is fed to the hydraulic servo C-2. By the engage pressure control means 390, moreover, the control pressure is reduced according to the input torque and the vehicle speed to discharge the oil pressure which has been fed to the hydraulic servo C2. After it has been confirmed by the shift status decide means 350 that the rotation change is ended, namely after the end of the 4–3 downshift, the shift valve 60 is switched to the 3rd speed state by the shift switch means 240. Specifically, as shown in FIG. 3, the engine brake control valve 54 and the 2–3 shift valve 58 take their right-hand positions, and the 1–2 shift valve 56 and the 3–4 shift valve 60 take their left-hand positions. Since, moreover, the B-1 timing valve 70 takes the right-hand position, the control pressure is fed to the B-1 hydraulic servo to engage it quickly, and the subroutine is then returned. In short, it is intended to always effect the braking by the engine in power-OFF. Incidentally, the time chart of the power-ON 4–3 downshift is shown at 2 in FIG. 15.

Figure 16A:
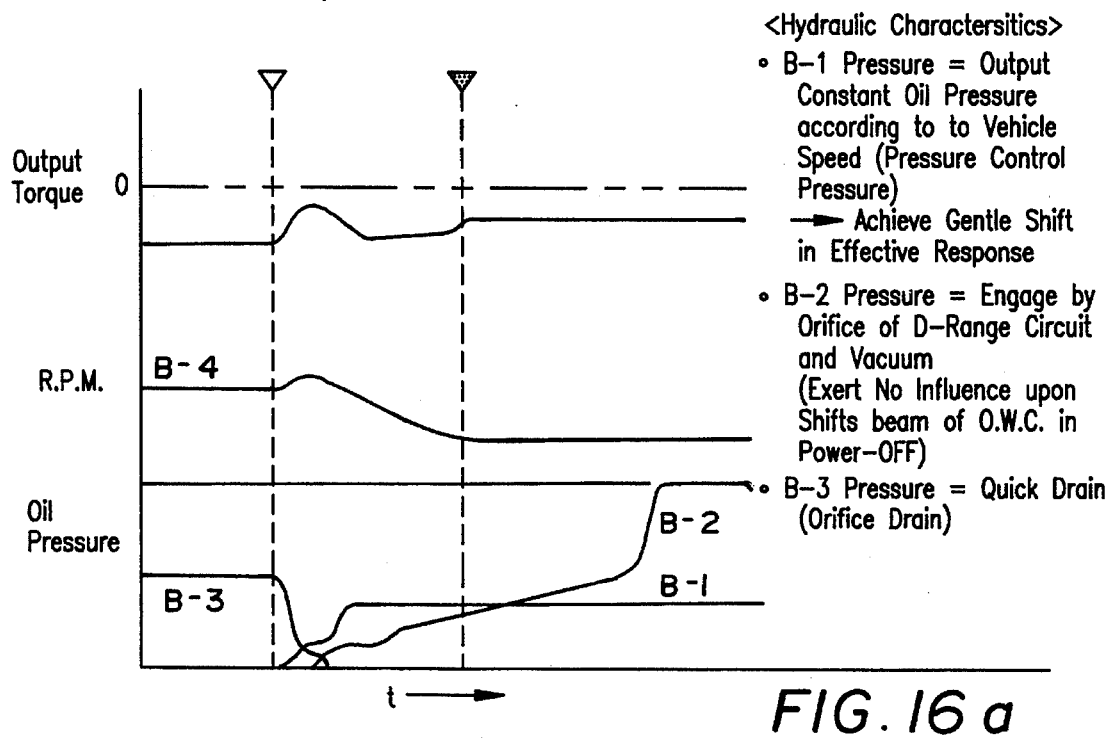
FIG. 16 is a time graph of 2–3 power-OFF upshift and 4–3 power-OFF downshift in an automatic transmission of the present invention.
Figure 16B:
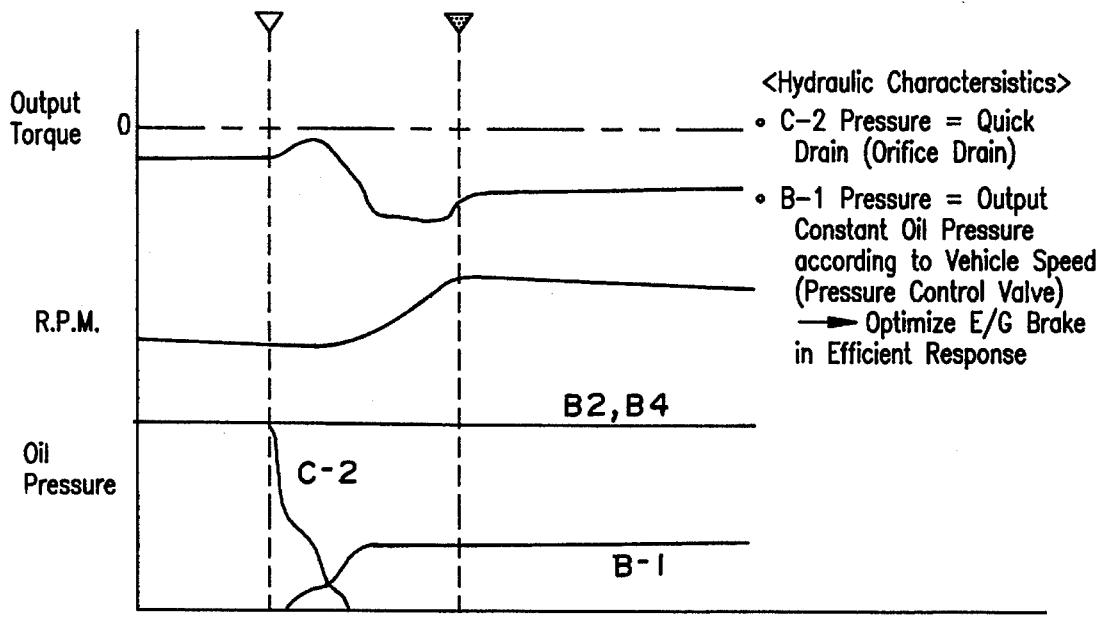

When it is decided that the shift is the power-OFF-upshift, the subroutine proceeds to Substep 52-3. In case of the power-OFF 2–3 upshift, for example, the shift valve 58 is switched to the 3rd speed state by the shift switch means 240. Specifically, as shown in FIG. 3, the engine brake control valve 54 and the 2–3 shift valve 58 take their right-hand positions, and the 1–2 shift valve 56 and the 3–4 shift valve 60 take their left-hand positions. Next, since the B-1 timing valve 70 takes the right-hand position, the control pressure is fed to the engine brake B-1 or the second hydraulic servo 220. In order to achieve a gentle shift with high response, the control pressure output by the engage pressure control means 390 is at a constant level according to the vehicle speed. At the same time, the oil pressure to the D-range clutch B-2 is fed from the oil passage through the orifice. After the control thus far described, the subroutine is returned. Incidentally, the time chart of the power-OFF 2–3 upshift is shown at 3 in FIG. 16.

Next, the subroutine advances to Substep 52-4 if it is decided that the shift is the power-OFF-downshift. Here will be described the 4–3 shift by way of example. At first, the shift valve 60 is brought into the 3rd speed state by the shift switch means 240. As shown in FIG. 5, the engine brake control valve 54 and the 2–3 shift valve 58 take their right-hand positions, and the 1–2 shift valve 56 and the 3–4 shift valve 60 take their left-hand positions. By bringing the B-1 timing valve 70 into the right-hand position, the control pressure is fed to the engine brake clutch B1 or the second hydraulic servo 220. Thus, the braking by the engine is ended. In 4th speed, the second brake B2 has already received activating pressure. Moreover, a constant pressure according to the vehicle speed is output as the control pressure by the engage pressure control means 390, and the subroutine is then returned. Incidentally, the time chart of the power-OFF 4–3 downshift is short at ~ in FIG. 16. The control according to the pattern thus decided at Step 40 is executed at Step 50, and the process then advances to Step 60, at which time it is decided whether or not the shift has been ended. The process returns to Step 10 if the shift is not ended yet, and the control is ended if it is confirmed that the shift is completed.

Incidentally, the 2→3, 3→2 and 4→3 shifts have been described in the present embodiment, but the remaining shifts can be similarly controlled. Moreover, the control is executed according to the input torque in power-ON and according to the vehicle speed in power-OFF time. Despite this fact, however, the control may be effected by using other parameters or by feedback control conforming to a target R.P.M. change. In case the shift feel can be selected, moreover, the rising and dropping rates of the control pressure can be changed according to the shift feel select signal. Furthermore, the shift status decide means 350 may detect the rotational speed status to take a timing in the shifting course.

What is claimed is:

1. A control system for a vehicular automatic transmission including a planetary gear unit and a plurality of hydraulically operated friction elements for connecting components of the planetary gear unit selectively either to rotary members or to stationary members, said control system comprising:

an electronic control unit for outputting at least one signal indicating a detected running condition of the vehicle;

a hydraulic control unit for selectively switching and controlling oil pressures to be fed to the friction elements, said hydraulic control unit comprising:

hydraulic servo means for achieving a first gear stage, said hydraulic servo means comprising a first hydraulic servo for engagement to provide engine braking;

a second hydraulic servo for achieving a second gear stage;

oil pressure generating means for generating a first oil pressure;

pressure regulating means for regulating said first oil pressure to produce a second oil pressure in accordance with the detected running condition of the vehicle;

shift switch means, disposed between said oil pressure generating means and both of (1) said hydraulic servo means and (2) said second hydraulic servo, for switching and controlling feed of said first oil pressure to either said hydraulic servo means or said second hydraulic servo in accordance with the detected running condition of the vehicle;

first oil passage means for feeding said first oil pressure from said oil pressure generating means to said hydraulic servo means, through said shift switch means;

flow control means disposed in said first oil passage means, between said hydraulic servo means and said shift switch means;

first switch means disposed between said pressure regulating means and said hydraulic servo means, for selectively feeding said second oil pressure to said first hydraulic servo in accordance with the detected running condition of the vehicle;

second switch means, disposed between said pressure regulating means and said first switch means, for selectively feeding said second oil pressure to said shift switch means in accordance with the detected running condition of the vehicle; and second oil passage means for feeding said second oil pressure from said pressure regulating means to said hydraulic servo means through said second switch means and said first switch means.

2. A control system for a vehicular automatic transmission according to claim 1, wherein said hydraulic servo means further comprises a third hydraulic servo which is engaged in said first gear stage in the absence of engine braking.

3. A control system for a vehicular automatic transmission according to claim 2, wherein said first switch means switches feed of said second oil pressure between said first hydraulic servo and said third hydraulic servo.

4. A control system for a vehicular automatic transmission according to claim 2, wherein said first switch means directs the second oil pressure to said third hydraulic servo at the time of a power-on upshift, and to said first hydraulic servo at the time of a power-off upshift.

5. A control system for a vehicular automatic transmission according to claim 1, wherein said electronic control unit further comprises:

a manual switch;

pressure regulating level decision means for controlling said pressure regulating means in accordance with a signal generated by said manual switch.

6. A control system for a vehicular automatic transmission according to claim 1, wherein said electronic control unit further comprises:

manual shift means for manually selecting a gear stage and for generating a shift command signal in accordance with the selected gear stage;

shift decision means for deciding an upshift or a downshift in accordance with said shift command signal and for outputting a decision signal indicating the decided upshift or downshift, said shift switch means switching and controlling said first oil pressure responsive to said decision signal.

7. A control system for a vehicular automatic transmission according to claim 6, further comprising:

accelerator opening detection means, vehicle speed detection means and shift lever position detection means; and wherein said shift decision means decides said upshift or downshift responsive to signals from said accelerator opening detection means, said vehicle speed detection means and said shift lever position detection means.

8. A control system for a vehicular automatic transmission according to claim 7, wherein said first switch means is controlled on the basis of a signal from said accelerator opening detection means.

9. A control system for a vehicular automatic transmission according to claim 8, wherein said shift switch means is controlled on the basis of signals from said accelerator opening detection means, said vehicle speed detection means and said shift position detection means.

10. A control system according to claim 1 wherein said detected running condition includes at least one of vehicle speed, accelerator opening and shift position.

* * * * *

UNITED STATES PATENT AND TRADEMARK OFFICE
CERTIFICATE OF CORRECTION

PATENT NO. : 5,501,645
DATED : March 26, 1996
INVENTOR(S) : TANIGUCHI et al

It is certified that error appears in the above-indentified patent and that said Letters Patent is hereby corrected as shown below:

Col. 2, line 15, delete "second" insert --first--;

Col. 5, line 48, after "FIG. 4" insert --shows the same control system at the time of achieving 4th speed--.

Col. 9, line 42, delete "or", first instance; and "the hydraulic servo" should read --(the hydraulic servo)--;

line 44, delete "or"; and "the" should read --(the--;

line 45, "second hydraulic servo" should read --second hydraulic servo)--; and line 46, after "engine" insert --(shown in Fig. 4)--.

Signed and Sealed this

Twenty-fifth Day of March, 1997

Attest:

BRUCE LEHMAN

Attesting Officer

Commissioner of Patents and Trademarks